(12) United States Patent
Lee (10) Patent No.: US 12,212,678 B2
(45) Date of Patent: Jan. 28, 2025

(54) COMPUTING SYSTEM AND OPERATING METHOD THEREOF

(71) Applicant: SK hynix Inc., Gyeonggi-do (KR)

(72) Inventor: Gun Wook Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/943,653

(22) Filed: Jul. 30, 2020

(65) Prior Publication Data

US 2021/0281414 A1 Sep. 9, 2021

(30) Foreign Application Priority Data

Mar. 9, 2020 (KR) ........................ 10-2020-0029238

(51) Int. Cl.
| | |
|---|---|
| *H04L 9/32* | (2006.01) |
| *G06F 3/06* | (2006.01) |
| *G06F 21/60* | (2013.01) |
| *H04L 9/08* | (2006.01) |

(52) U.S. Cl.
CPC .......... *H04L 9/3226* (2013.01); *G06F 3/0622* (2013.01); *G06F 3/0655* (2013.01); *G06F 3/0679* (2013.01); *G06F 21/602* (2013.01); *H04L 9/085* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 7,512,759 B2 | 3/2009 | Nakanishi et al. | |
| 8,341,417 B1* | 12/2012 | McGrew | G06F 21/64 |
| | | | 713/181 |
| 8,918,654 B2 | 12/2014 | Hashimoto et al. | |
| 9,258,111 B2* | 2/2016 | Lee | H04L 9/0897 |
| 9,760,962 B2 | 9/2017 | Lese | |
| 10,671,544 B2 | 6/2020 | Kim | |
| 11,362,830 B2* | 6/2022 | Kanbe | G06F 3/0637 |
| 11,455,102 B2 | 9/2022 | Lee | |
| 11,461,021 B2 | 10/2022 | Lee | |

(Continued)

FOREIGN PATENT DOCUMENTS

| | | |
|---|---|---|
| CN | 110096908 A | 8/2019 |
| KR | 10-1991905 | 6/2019 |
| KR | 1020210104278 A | 8/2021 |

OTHER PUBLICATIONS

NVM Express™ Base Specification, NVM Express Revision 1.3c, May 24, 2018, NVM Express, Inc., Beaverton, USA.

(Continued)

*Primary Examiner* — Saleh Najjar
*Assistant Examiner* — Shadi H Kobrosli
(74) *Attorney, Agent, or Firm* — IP & T GROUP LLP (57) ABSTRACT

An electronic device is provided. A computing system includes a host and a storage device. The host generates a host authentication code. The storage device receives a first request among a series of first to third requests regarding security write and write data from the host, generates a device authentication code based on the write data, receives the second request and the host authentication code from the host, and performs a program operation on the write data based on a result of comparing the host authentication code with the device authentication code.

20 Claims, 9 Drawing Sheets

(56) References Cited

U.S. PATENT DOCUMENTS

| | | | |
|---|---|---|---|
| 11,561,737 B2* | 1/2023 | Ishihara | G06F 3/0629 |
| 2003/0187799 A1 | 10/2003 | Sellars et al. | |
| 2008/0172749 A1 | 7/2008 | Ko et al. | |
| 2011/0167269 A1* | 7/2011 | Baykal | H04L 9/3226 |
| | | | 713/169 |
| 2011/0185435 A1 | 7/2011 | Chang | |
| 2011/0246707 A1* | 10/2011 | Ito | G06F 12/14 |
| | | | 711/E12.008 |
| 2013/0013934 A1 | 1/2013 | King et al. | |
| 2013/0081144 A1 | 3/2013 | Kambayashi | |
| 2013/0151848 A1 | 6/2013 | Baumann et al. | |
| 2013/0304711 A1* | 11/2013 | Resch | G06F 11/3485 |
| | | | 707/690 |
| 2015/0046634 A1 | 2/2015 | Maeda et al. | |
| 2015/0089218 A1 | 3/2015 | Overby | |
| 2015/0350206 A1* | 12/2015 | Shin | H04L 63/0876 |
| | | | 713/170 |
| 2016/0034683 A1 | 2/2016 | Lee et al. | |
| 2019/0052632 A1 | 2/2019 | Takagi | |
| 2019/0102568 A1* | 4/2019 | Hausauer | H04L 63/06 |
| 2019/0236031 A1 | 8/2019 | Kim | |
| 2019/0303304 A1* | 10/2019 | Lee | G06F 12/1466 |
| 2020/0050799 A1 | 2/2020 | Yamada et al. | |
| 2020/0201783 A1 | 6/2020 | Lee et al. | |
| 2020/0241768 A1 | 7/2020 | Chen et al. | |
| 2020/0244458 A1* | 7/2020 | Kanbe | G06F 3/0637 |
| 2020/0328879 A1* | 10/2020 | Makaram | G06F 21/6209 |
| 2020/0412534 A1 | 12/2020 | Liu | |
| 2021/0026542 A1* | 1/2021 | Carlson | G06F 3/0688 |
| 2021/0216616 A1 | 7/2021 | Lee et al. | |
| 2021/0278979 A1 | 9/2021 | Lee | |
| 2022/0261358 A1* | 8/2022 | Lee | G06F 12/1441 |

OTHER PUBLICATIONS

Jedec Standard Universal Flash Storage (UFS) Version 2.1, JESD220C, Mar. 2016, Jedec Solid State Technology Association, Arlington, USA.

Jedec Standard Universal Flash Storage (UFS) Version 3.0, JESD220D, Jan. 2018, Jedec Solid State Technology Association, Arlington, USA.

NVM Express™ Base Specification, NVM Express Revision 1.4, Jun. 10, 2019, NVM Express, Inc., Beaverton, USA.

Office Action issued by the USPTO for U.S. Appl. No. 16/943,597 on Dec. 17, 2021.

Office Action issued by the USPTO for U.S. Appl. No. 17/157,316 on Jan. 31, 2022.

Notice of Allowance for the U.S. Appl. No. 17/157,316 issued by the USPTO on Jun. 10, 2022.

Office Action for the U.S. Appl. No. 17/900,936 issued by the USPTO on Dec. 22, 2022.

Office Action for the Chinese Patent Application No. 202010893314.4 issued by the Chinese Patent Office on Sep. 25, 2023.

Office Action for the U.S. Appl. No. 17/900,936 issued by the USPTO on May 17, 2023.

* cited by examiner

COMPUTING SYSTEM AND OPERATING METHOD THEREOF

CROSS-REFERENCE TO RELATED APPLICATION

The present application claims priority under 35 U.S.C. § 119(a) to Korean patent application number 10-2020-0029238, filed on Mar. 9, 2020, which is incorporated herein by reference in its entirety.

BACKGROUND

Field of Invention

Various embodiments of the present disclosure relate generally to an electronic device, and more particularly, to a computing system and an operating method thereof.

Description of Related Art

A storage device may store data in response to control of a host device such as a computer or a smartphone. A storage device may include a memory device storing data and a memory controller controlling the memory device. Generally, there are two types of memory devices: volatile memory devices and nonvolatile memory devices.

Volatile memory devices may store data only when power is supplied thereto, and may lose stored data when power supply is not supplied. Examples of volatile memory devices include Static Random Access Memory (SRAM) and Dynamic Random Access Memory (DRAM).

Nonvolatile memory devices may retain stored data even when supply of power is interrupted or blocked. Examples of nonvolatile memory devices include Read Only Memory (ROM), Programmable ROM (PROM), Electrically Programmable ROM (EPROM), Electrically Erasable and Programmable ROM (EEPROM), and flash memory.

SUMMARY

Various embodiments of the present disclosure are directed to a computing system having improved write performance and a method of operating the computing system.

According to an embodiment, a computing system may include a host and a storage device. The host may generate a host authentication code. The storage device may receive a first request among a series of requests, including the first request and a second request, regarding security write and write data from the host, generate a device authentication code based on the write data, receive the second request and the host authentication code from the host, and perform a program operation on the write data based on a result of comparing the host authentication code with the device authentication code.

According to an embodiment, a host may include host memory and a host processor. The host memory may store write data. The host processor may provide a first request among a series of requests, including at least the first request and a second request, regarding security write and write data to a storage device, provide the write data and generate a host authentication code in parallel, and provide the second request and the host authentication code to the storage device.

According to an embodiment, a method of operating a host controlling security write of a storage device may include providing a first request among a series of requests, including at least a first request and second request, regarding security write and write data to a storage device in parallel with generating a host authentication code; receiving a first response, which indicates whether the first request has been received, from the storage device; and providing the second request and the host authentication code to the storage device.

According to an embodiment, a computing system may include a host and a storage device. The storage device may include a memory device including a write protection area. The host may perform in parallel an operation of providing, to the storage device, a first request regarding security write and write data and an operation of generating a host authentication code based on the write data and a key shared with the storage device.

DETAILED DESCRIPTION

Specific structural and functional description is provided herein only to describe embodiments of the invention. However, the invention may be configured and/or carried out in various other ways, as those skilled in the art will understand from the present disclosure. Thus, the invention is not limited to any of disclosed embodiments nor to any specific detail described in this specification. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
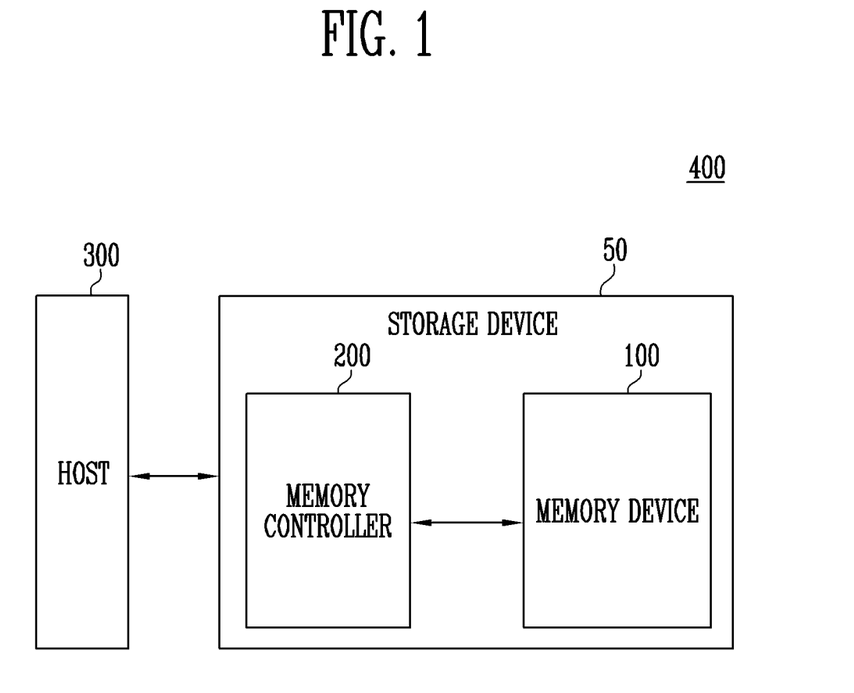
FIG. 1 is a diagram illustrating a computing system according to an embodiment of the present disclosure.

FIG. 1 is a diagram illustrating a computing system 400 according to an embodiment of the present disclosure.

Referring to FIG. 1, the computing system 400 may include a storage device 50 and a host 300.

The storage device 50 may include a memory device 100 and a memory controller 200 controlling operations of the memory device 100. The storage device 50 may store data in response to control of the host 300. Examples of the storage device 50 include a cellular phone, a smartphone, an MP3 player, a laptop computer, a desktop computer, a game player, a TV, a tablet PC, and an in-vehicle infotainment system.

The storage device 50 may be configured as any of various types of storage devices depending on a host interface which is a communication method with the host 300. For example, the storage device 50 may be configured as a solid state drive (SSD), a multimedia card in the form of a multimedia card (MMC), an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, or a memory stick.

The storage device 50 may be manufactured as any of various types of packages. For example, the storage device 50 may be manufactured as a package-on-package (POP), a system-in-package (SIP), a system-on-chip (SOC), a multi-chip package (MCP), a chip-on-board (COB), a wafer-level fabricated package (WFP), or a wafer-level stack package (WSP).

The memory device 100 may store data. The memory device 100 may operate in response to control of the memory controller 200. The memory device 100 may include a memory cell array including a plurality of memory cells storing data.

Each of the memory cells may be a Single-Level Cell (SLC) storing one bit of data, a Multi-Level Cell (MLC) storing two bits of data, a Triple-Level Cell (TLC) storing three bits of data, or a Quad-Level Cell (QLC) storing four bits of data.

The memory cell array may include a plurality of memory blocks, each of which may include a plurality of memory cells. Each memory block may include a plurality of pages. According to an embodiment, a page may be a unit for storing data in the memory device 100 or reading data stored in the memory device 100.

The memory block may be a unit for erasing data. According to an embodiment, the memory device 100 may be Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, Vertical NAND flash memory, NOR flash memory, resistive random access memory (RRAM), phase-change memory (PRAM), magnetoresistive random access memory (MRAM), ferroelectric random access memory (FRAM), or spin-transfer torque random access memory (STT-RAM). By way of example, it is assumed that the memory device 100 is NAND flash memory in the context of the following description.

The memory device 100 may receive a command and an address from the memory controller 200, and access an area selected by the address in the memory cell array. That is, the memory device 100 may perform an operation that the command instructs on the area selected by the address. For example, the memory device 100 may perform a write operation (or a program operation), a read operation, and an erase operation. During the program operation, the memory device 100 may program the area selected by the address with data. During the read operation, the memory device 100 may read data from the area selected by the address. During the erase operation, the memory device 100 may erase data stored in the area selected by the address.

According to an embodiment, the memory device 100 may include a write protection area. Write data that has verified integrity may be stored in the write protection area. Integrity may refer to a state in which write data received from the host 300 is not distorted or modulated.

The memory controller 200 may control general operation of the storage device 50.

When power is applied to the storage device 50, the memory controller 200 may execute firmware (FW). When the memory device 100 is a flash memory device, the memory controller 200 may execute firmware such as a flash translation layer (FTL) for controlling communication between the host 300 and the memory device 100.

According to an embodiment, the memory controller 200 may receive data and a logical block address (LBA) from the host 300 and translate the LBA into a physical block address (PBA) indicating an address of memory cells in which data is to be stored in the memory device 100.

For example, the memory controller 200 may control the memory device 100 to perform a program operation, a read operation or an erase operation in response to a request from the host 300. During the program operation, the memory controller 200 may provide the memory device 100 with a write command, a PBA, and data. During the read operation, the memory controller 200 may provide the memory device 100 with a read command and a PBA. During the erase operation, the memory controller 200 may provide the memory device 100 with an erase command and a PBA.

According to an embodiment, the memory controller 200 may generate and transfer a command, an address, and data to the memory device 100 regardless of a request from the host 300. For example, the memory controller 200 may provide the memory device 100 with a command, an address, and data to perform background operations, such as a program operation for wear leveling and a program operation for garbage collection.

According to an embodiment, the memory controller 200 may control at least two memory devices 100. The memory controller 200 may control the memory devices 100 according to an interleaving scheme so as to improve operation performance. In the interleaving scheme operating periods of two or more memory devices 100 may at least partially overlap.

According to an embodiment, the memory controller 200 may generate a device authentication code using the write data received from the host 300 and a key shared with the host 300. The memory controller 200 may verify integrity of the write data based on a result of comparing the device authentication code with a host authentication code received from the host 300. The memory controller 200 may control the memory device 100 to store write data that has verified integrity in the write protection area in response to the request from the host 300. The memory controller 200 may provide the host 300 with a result of a program operation on the write data in response to the request from the host 300. The result of the program operation may include information as to whether the write data has integrity and information as to whether the program operation has passed or failed.

The host 300 may communicate with the storage device 50 using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Communication regarding security write between the host 300 and the storage device 50 is described later with reference to FIGS. 2 and 3.

Figure 2:
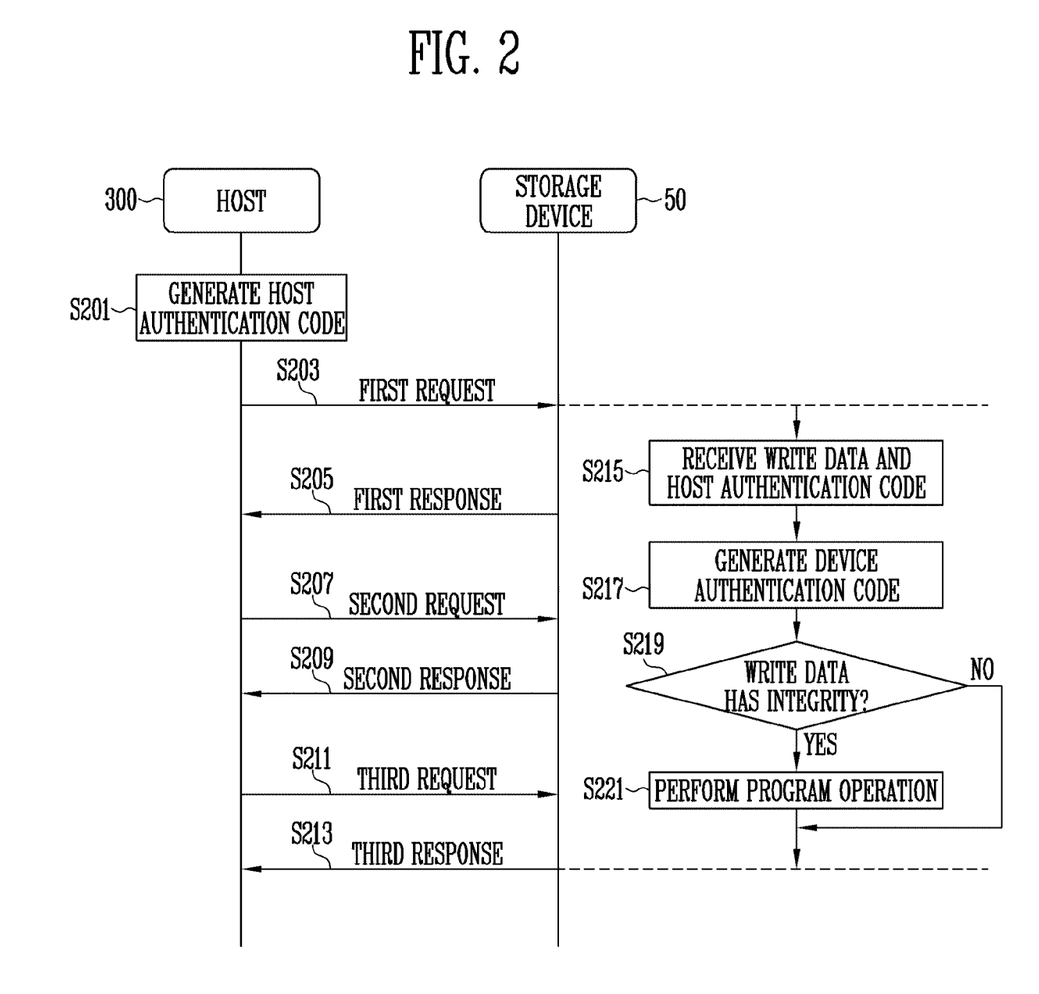
FIG. 2 is a diagram illustrating security write according to an embodiment.

FIG. 2 is a diagram illustrating security write according to an embodiment.

Referring to FIG. 2, at step S201, the host 300 may generate a host authentication code based on a key shared with the storage device 50 and write data. The host 300 may generate the host authentication code by using a message authentication code (MAC) algorithm. The host authentication code may be used for verifying integrity of the write data. In other words, the host authentication code may be used for verifying whether the write data is distorted or modulated during the transmission of the write data from the host 300 to the storage device 50.

The host 300 may provide the storage device 50 with a series of requests, e.g., first to third requests, for security write.

At step S203, the host 300 may provide the storage device 50 with the first request. The first request may be for programming the write data into a write protection area of the storage device 50. The host 300 may provide the storage device 50 with the first request, the write data, and the host authentication code.

At step S205, the storage device 50 may provide the host 300 with a first response indicating whether the first request has been received.

At step S207, the host 300 may provide the storage device 50 with the second request in response to the first response. The second request may be for checking whether a result of a program operation on the write data is available, i.e., ready to be collected.

At step S209, the storage device 50 may provide the host 300 with a second response indicating whether the second request has been received.

At step S211, the host 300 may provide the storage device 50 with the third request in response to the second response. The third request may be for the result of the program operation on the write data.

At step S213, the storage device 50 may provide the host 300 with a third response including the result of the program operation on the write data, in response to the third request. The result of the program operation may include information indicating whether the program operation has passed or failed, and also may include information indicating whether the write data has integrity.

At step S215, the storage device 50 may receive the write data and the host authentication code, together with the first request from the host 300.

At step S217, the storage device 50 may generate a device authentication code based on a key shared with the host 300 and the received write data. The storage device 50 may generate the device authentication code by using a message authentication code (MAC) algorithm.

At step S219, the storage device 50 may verify whether the write data has integrity. According to a result of verification, when it is determined that the write data has integrity, the process flow may proceed to step S221. Alternatively, when it is determined that the write data does not have integrity, the process flow may proceed to step S213.

At step S221, the storage device 50 may perform a program operation of storing the write data in the write protection area. After the program operation is performed, the storage device 50 may generate information indicating whether the program operation has passed or failed. After performing step S221, the process flow may proceed to step S213.

Figure 3:
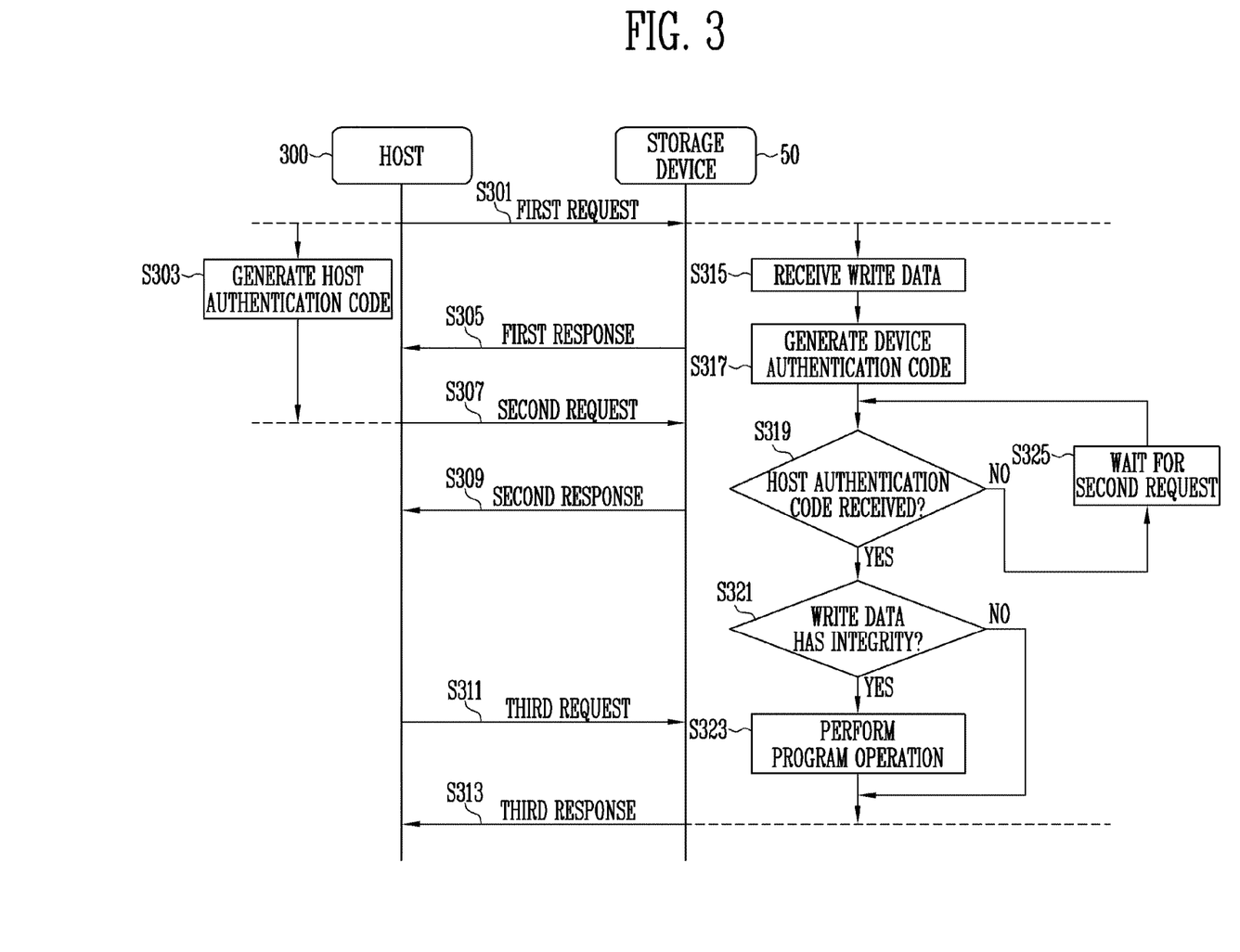
FIG. 3 is a diagram illustrating security write according to an embodiment.

FIG. 3 is a diagram illustrating security write according to an embodiment.

Referring to FIG. 3, the host 300 may provide the storage device 50 with a series of first to third requests for security write.

At step S301, the host 300 may provide the storage device 50 with the first request. The first request may be for programming write data into a write protection area of the storage device 50. The host 300 may provide the storage device 50 with the first request and the write data.

At step S303, the host 300 may generate a host authentication code after providing the storage device 50 with the first request. The host 300 may generate the host authentication code based on a key shared with the storage device 50 and the write data. The host 300 may generate the host authentication code by using a message authentication code (MAC) algorithm. The host 300 may provide the write data to the storage device 50 in parallel with the generation of the host authentication code. In other words, the host 300 may initiate the generation of the host authentication code when the write data is transmitted to the storage device 50.

According to various embodiments, the storage device 50 may generate a device authentication code at step S317 when the host 300 generates the host authentication code at step S303. In other words, the generation of the host authentication code may be performed in parallel with the generation of the device authentication code.

At step S305, the storage device 50 may provide the host 300 with a first response indicating whether the first request has been received.

At step S307, the host 300 may provide the storage device 50 with the second request in response to the first response when the generation of the host authentication code is completed. The second request may be for checking whether a result of a program operation on the write data is ready to be collected. The host 300 may provide the storage device 50 with the second request and the host authentication code.

At step S309, the storage device 50 may provide the host 300 with a second response indicating whether the second request has been received.

At step S311, the host 300 may provide the storage device 50 with the third request in response to the second response. The third request may be for the result of the program operation on the write data.

At step S313, the storage device 50 may provide the host 300 with a third response including the result of the program operation on the write data. The result of the program operation may include information indicating whether the program operation has passed or failed, and also may include information indicating whether the write data has integrity.

At step S315, the storage device 50 may receive the write data, together with the first request from the host 300.

At step S317, the storage device 50 may generate a device authentication code based on a key shared with the host 300 and the received write data. The storage device 50 may generate the device authentication code by using a message authentication code (MAC) algorithm.

At step S319, the storage device 50 may determine whether the host authentication code has been received from the host 300. When it is determined that the host authentication code has been received, the process flow may proceed to step S321. Alternatively, when it is determined that the host authentication code has not been received, the process flow may proceed to step S325.

At step S321, the storage device 50 may verify whether the write data has integrity. According to a result of verification, when it is determined that the write data has integrity, the process flow may proceed to step S323. Alternatively, when it is determined that the write data does not have integrity, the process flow may proceed to step S313.

At step S323, the storage device 50 may perform a program operation of storing the write data in the write protection area. After the program operation is performed, the storage device 50 may generate information indicating whether the program operation has passed or failed. After performing step S323, the process flow may proceed to step S313.

At step S325, the storage device 50 may wait until the host authentication code is received together with the second request from the host 300. After performing step S325, the process flow may proceed to step S319.

In the embodiment illustrated in FIG. 3, the generation of the host authentication code may be performed in parallel with the transmission of the write data from the host 300 to the storage device 50. Accordingly, the time required to perform a security write operation may be reduced by the time during which the generation of the host authentication code overlaps the transmission of the write data.

According to another embodiment, the generation of the host authentication code may be performed in parallel with the generation of the device authentication code of the storage device 50. Accordingly, the time required to perform the security write operation may be reduced by the time during which the generation of the host authentication code overlaps the generation of the device authentication code.

Figure 4:
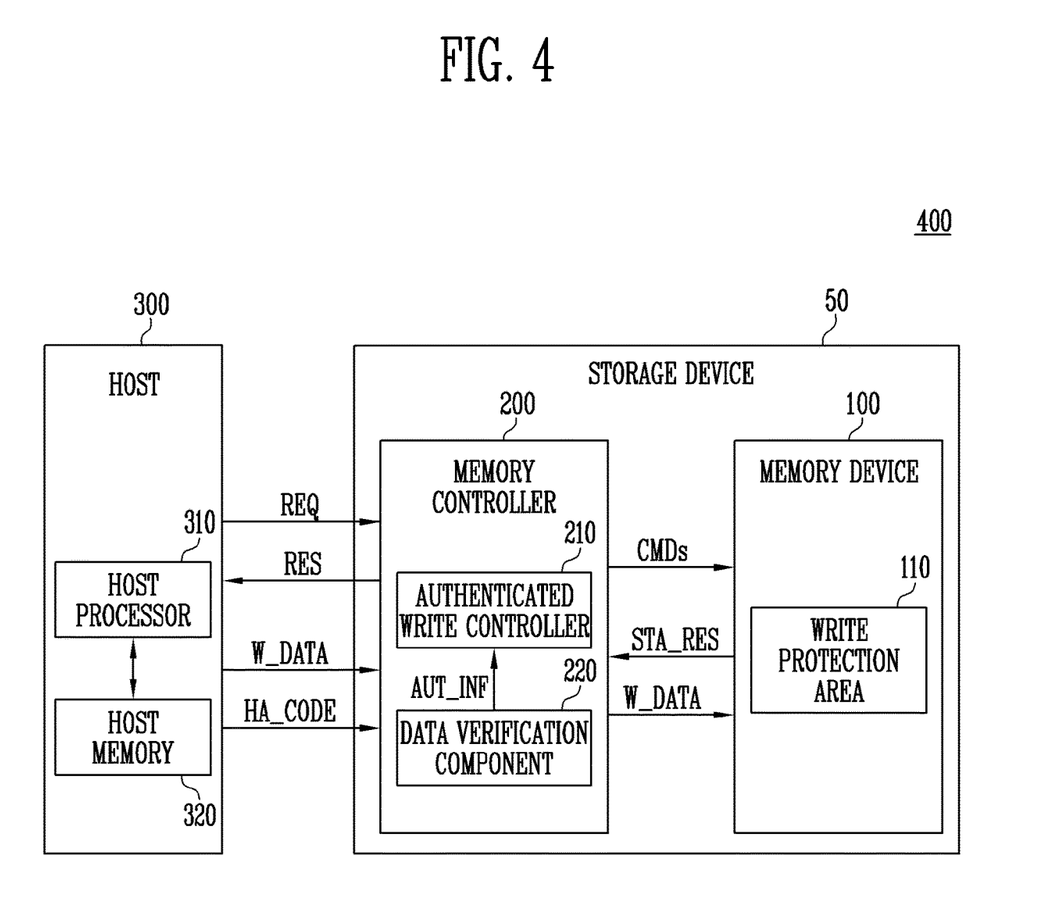
FIG. 4 is a diagram illustrating a configuration and operations of a computing system, such as that shown in FIG. 1, according to an embodiment.

FIG. 4 is a diagram illustrating a configuration and operations of the computing system 400 shown in FIG. 1 according to an embodiment.

Referring to FIG. 4, the computing system 400 may include the storage device 50 and the host 300.

According to an embodiment, the memory device 100 may include a write protection area 110.

The write protection area 110 may be a region in which write data W_DATA that has verified integrity is stored. Integrity may refer to a state in which the write data W_DATA received from the host 300 is not distorted or modulated.

The memory device 100 may perform a program operation of storing the write data W_DATA that has the verified integrity in the write protection area 110 in response to a program command received from the memory controller 200. The memory device 100 may provide the memory controller 200 with a state read response STA_RES including information that indicates whether the program operation has passed or failed, in response to a state read command received from the memory controller 200.

According to an embodiment, the memory controller 200 may include an authenticated write controller 210 and a data verification component 220.

The authenticated write controller 210 may provide the host 300 with responses RES to a series of requests REQ regarding security write which are received from the host 300. The series of requests REQ regarding the security write may include the first to third requests described with reference to FIGS. 2 and 3.

For example, the authenticated write controller 210 may receive the first request and the write data W_DATA from the host 300. The authenticated write controller 210 may provide the host 300 with a first response indicating whether the first request has been received, in response to the first request received from the host 300. The first request may be for programming the write data W_DATA into the write protection area 110 of the memory device 100.

The authenticated write controller 210 may receive the second request and a host authentication code HA_CODE from the host 300. The authenticated write controller 210 may provide the host 300 with a second response indicating whether the second request has been received, in response to the second request received from the host 300. The second request may be for checking whether a result of the program operation on the write data W_DATA is ready to be collected.

The authenticated write controller 210 may receive the third request to request the result of the program operation on the write data W_DATA from the host 300. The authenticated write controller 210 may provide the host 300 with a third response including the result of the program operation on the write data W_DATA, in response to the third request received from the host 300.

The authenticated write controller 210 may control the memory device 100 to store the write data W_DATA in the write protection area 110. For example, the authenticated write controller 210 may determine whether the write data W_DATA has integrity based on authentication information AUT_INF received from the data verification component 220. The authenticated write controller 210 may provide the memory device 100 with a program command about the write data W_DATA that has the verified integrity.

After providing the memory device 100 with the program command, the authenticated write controller 210 may provide the memory device 100 with the state read command to receive the result of the program operation. The authenticated write controller 210 may receive the state read response STA_RES indicating the result of the program operation from the memory device 100. The state read response STA_RES may include information indicating whether the program operation has passed or failed.

The authenticated write controller 210 may provide the host 300 with a response including the result of the program operation of storing the write data W_DATA in the write protection area 110. The result of the program operation may include information as to whether the write data W_DATA has the integrity and as to whether the program operation has passed or failed.

The data verification component 220 may generate the authentication information AUT_INF indicating the integrity of the write data W_DATA received from the host 300. The data verification component 220 may provide the authenticated write controller 210 with the authentication information AUT_INF.

More specifically, the data verification component 220 may generate a device authentication code by using the write data W_DATA received from the host 300 and a key shared with the host 300. The data verification component 220 may generate the authentication information AUT_INF indicating the integrity of the write data W_DATA based on a result of comparing the host authentication code HA_CODE received from the host 300 with the device authentication code. The host authentication code HA_CODE may be received when the authenticated write controller 210 receives the second request from the host 300.

According to an embodiment, the host 300 may include a host processor 310 and host memory 320.

The host processor 310 may provide the memory controller 200 with the series of requests REQ regarding security write. The series of requests REQ may include first to third requests as described with reference to FIGS. 2 and 3.

The host processor 310 may provide the memory controller 200 with the write data W_DATA stored in the host memory 320 and the first request.

After providing the memory controller 200 with the first request, the host processor 310 may generate the host authentication code HA_CODE based on a key shared with the storage device 50 and the write data W_DATA.

The host processor 310 may provide the write data W_DATA to the memory controller 200 in parallel with the generation of the host authentication code HA_CODE. In other words, the generation of the host authentication code HA_CODE may be performed in parallel with the transmission of the write data W_DATA.

When the generation of the host authentication code HA_CODE is completed, the host processor 310 may provide the memory controller 200 with the second request and the host authentication code HA_CODE in response to the first response received from the memory controller 200.

The host processor 310 may provide the memory controller 200 with the third request regarding the result of the program operation on the write data W_DATA, in response to the second response received from the memory controller 200.

The host memory 320 may store the write data W_DATA to be provided to the memory controller 200.

According to an embodiment described with reference to FIG. 4, the generation of the host authentication code HA_CODE by the host processor 310 may be performed in parallel with the transmission of the write data W_DATA to the storage device 50. Accordingly, a time required to perform a security write operation may be reduced by a time when the generation of the host authentication code HA_CODE overlaps the transmission of the write data W_DATA.

According to an embodiment described with reference to FIG. 4, the generation of the host authentication code HA_CODE by the host processor 310 may be performed in parallel with the generation of the device authentication code by the data verification component 220. Accordingly, the time required to perform the security write operation may be reduced by a time during which the generation of the host authentication code HA_CODE overlaps the generation of the device authentication code.

Figure 5:
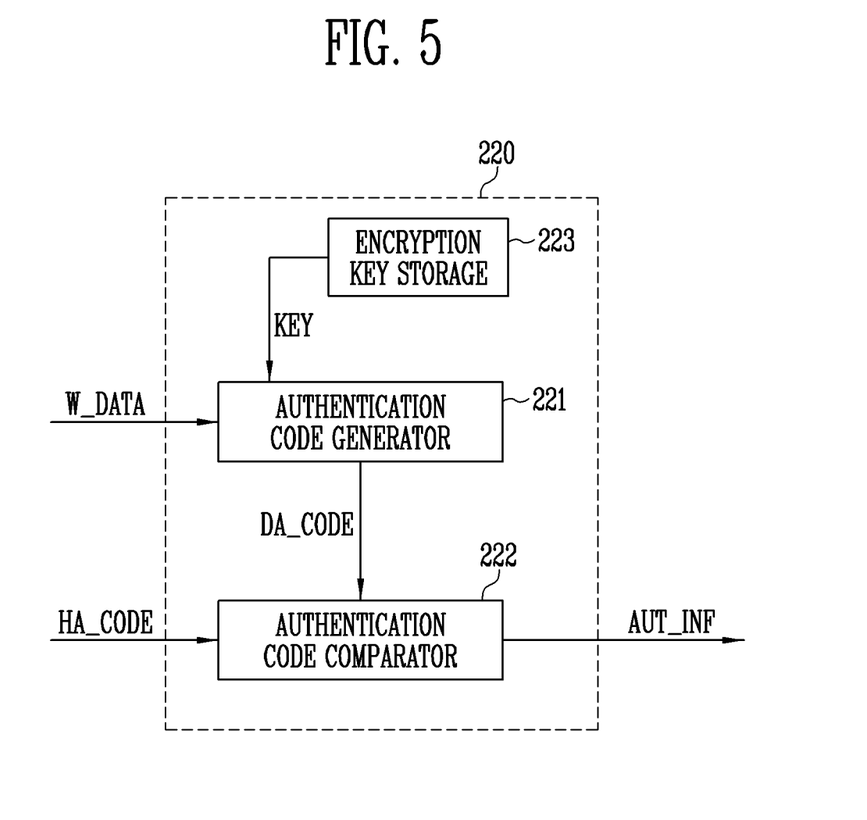
FIG. 5 is a diagram illustrating a data verification component, such as that shown in FIG. 4.

FIG. 5 is a diagram illustrating the data verification component 220 shown in FIG. 4.

Referring to FIG. 5, the data verification component 220 may include an authentication code generator 221 and an authentication code comparator 222. The data verification component 220 may further include an encryption key storage 223.

The authentication code generator 221 may generate a device authentication code DA_CODE based on the write data W_DATA received from the host and a shared key KEY received from the encryption key storage 223. The authentication code generator 221 may generate the device authentication code DA_CODE by using a message authentication code (MAC) algorithm. The authentication code generator 221 may provide the authentication code comparator 222 with the device authentication code DA_CODE.

The authentication code comparator 222 may generate the authentication information AUT_INF indicating integrity of the write data W_DATA based on the comparison between the host authentication code HA_CODE received from the host and the device authentication code DA_CODE. The authentication code comparator 222 may determine whether the write data W_DATA has integrity according to whether the host authentication code HA_CODE is the same as the device authentication code DA_CODE.

The encryption key storage 223 may store the shared key KEY between the host and the storage device. The shared key KEY may be used for generating an authentication code. The shared key KEY may be previously stored in the encryption key storage 223. The shared key KEY may be changed in response to a request of the host.

Figure 6:
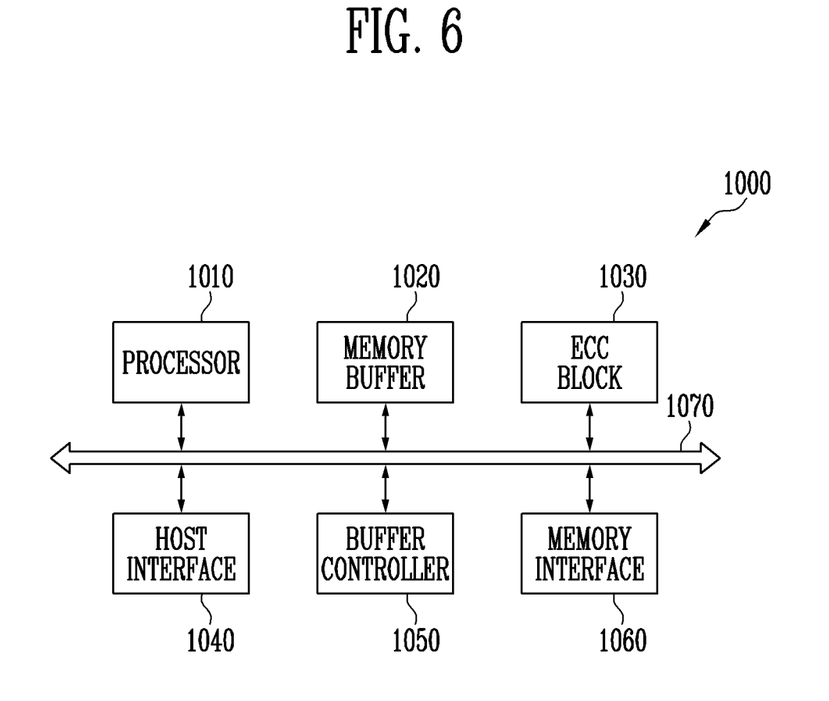
FIG. 6 is a diagram illustrating another embodiment of a memory controller.

FIG. 6 is a diagram illustrating another embodiment of a memory controller shown in FIG. 1.

Referring to FIG. 6, a memory controller 1000 may be coupled to a host and a memory device. The memory controller 1000 may access the memory device in response to a request from the host. For example, the memory controller 1000 may control write, read, erase, and background operations of the memory device. The memory controller 1000 may provide an interface between the memory device and the host. The memory controller 1000 may be configured to drive firmware for controlling the memory device.

The memory controller 1000 may include a processor 1010, a memory buffer 1020, an error correction code (ECC) block 1030, a host interface 1040, a buffer controller 1050, a memory interface 1060, and a bus 1070.

The bus 1070 may provide a channel between components of the memory controller 1000.

The processor 1010 may control overall operation of the memory controller 1000 and may perform a logical operation. The processor 1010 may communicate with an external host through the host interface 1040 and communicate with the memory device through the memory interface 1060. Further, the processor 1010 may communicate with the memory buffer 1020 through the buffer controller 1050. The processor 1010 may control operations of a storage device by using the memory buffer 1020 as operational memory, cache memory or buffer memory.

The processor 1010 may perform the function of a flash translation layer (FTL). The processor 1010 may translate a logical block address (LBA), which is provided by the host, to a physical block address (PBA) through the FTL. The FTL may receive the LBA and translate the LBA to the PBA by using a mapping table. There may be various address mapping methods for the FTL depending on a mapping unit. Typical address mapping methods may include a page mapping method, a block mapping method and a hybrid mapping method.

The processor 1010 may be configured to randomize data received from the host. For example, the processor 1010 may randomize the data received from the host using a randomizing seed. The randomized data may be provided to the memory device as data to be stored and may be programmed into a memory cell array.

The processor 1010 may be configured to derandomize data received from the memory device during a read operation. For example, the processor 1010 may derandomize the data received from the memory device using a derandomizing seed. The derandomized data may be output to the host.

According to an embodiment, the processor 1010 may run software or firmware to perform randomizing and derandomizing operations.

The memory buffer 1020 may serve as operational memory, cache memory, or buffer memory of the processor 1010. The memory buffer 1020 may store codes and commands executed by the processor 1010. The memory buffer 1020 may store data processed by the processor 1010. The memory buffer 1020 may include Static RAM (SRAM) or Dynamic RAM (DRAM).

The ECC block 1030 may perform error correction. The ECC block 1030 may perform ECC encoding based on data to be written to the memory device through the memory interface 1060. The ECC-encoded data may be transmitted to the memory device through the memory interface 1060. The ECC block 1030 may perform ECC decoding on data received from the memory device through the memory interface 1060. For example, the ECC block 1030 may be included as a component of, and disposed in, the memory interface 1060.

The host interface 1040 may be configured to communicate with the external host under the control of the processor 1010. The host interface 1040 may perform communication using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer controller 1050 may be configured to control the memory buffer 1020 under the control of the processor 1010.

The memory interface 1060 may be configured to communicate with the memory device under the control of the processor 1010. The memory interface 1060 may exchange commands, addresses, and data with the memory device through channels.

In an embodiment, the memory controller 1000 does not include the memory buffer 1020 and the buffer controller 1050. Instead, one or both of these components may be provided separately, and/or the functionality of one or both such components may be distributed within the memory controller 1000.

For example, the processor 1010 may control the operations of the memory controller 1000 using codes. The processor 1010 may load codes from a nonvolatile memory device provided in the memory controller 1000 (for example, Read Only Memory (ROM)). In another example, the processor 1010 may load codes from the memory device through the memory interface 1060.

For example, the bus 1070 of the memory controller 1000 may be divided into a control bus and a data bus. The data bus may be configured to transmit data in the memory controller 1000, and the control bus may be configured to transmit control information such as commands and addresses in the memory controller 1000. The data bus and the control bus may be isolated from each other so as not to interfere with, nor influence, each other. The data bus may be coupled to the host interface 1040, the buffer controller 1050, the ECC block 1030, and the memory interface 1060. The control bus may be coupled to the host interface 1040, the processor 1010, the buffer controller 1050, the memory buffer 1020, and the memory interface 1060.

According to an embodiment, the authenticated write controller 210 and the data verification component 220 may be included in the processor 1010.

Figure 7:
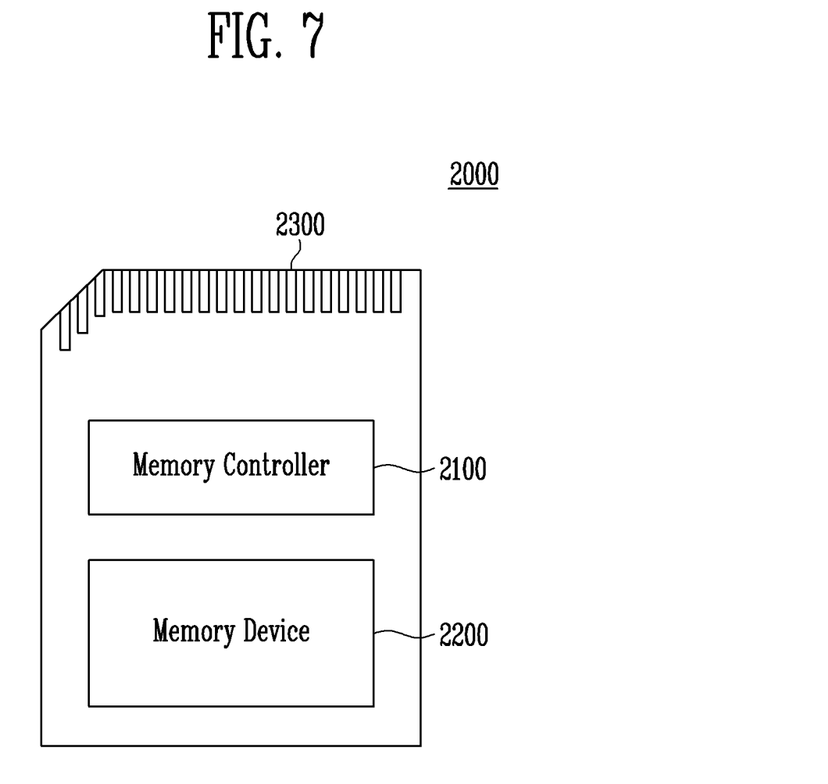
FIG. 7 is a block diagram illustrating a memory card system to which a storage device is applied according to an embodiment of the present disclosure.

FIG. 7 is a block diagram illustrating a memory card system 2000 to which a storage device is applied according to an embodiment of the present disclosure.

Referring to FIG. 7, the memory card system 2000 may include a memory controller 2100, a memory device 2200, and a connector 2300.

The memory controller 2100 may be coupled to the memory device 2200. The memory controller 2100 may access the memory device 2200. For example, the memory controller 2100 may be configured to control read, write, erase and background operations of the memory device 2200. The memory controller 2100 may be configured to provide an interface between the memory device 2200 and the host. The memory controller 2100 may be configured to drive firmware for controlling the memory device 2200. The memory controller 2100 may be configured in the same manner as the memory controller 200 described above with reference to FIG. 1.

For example, the memory controller 2100 may include components, such as Random Access Memory (RAM), a processing unit, a host interface, a memory interface, and an ECC block.

The memory controller 2100 may communicate with an external device through the connector 2300. The memory controller 2100 may communicate with the external device (for example, a host) based on a specific communication protocol. For example, the memory controller 2100 may communicate with the external device through at least one of various communication protocols such as a Universal Serial Bus (USB), a multimedia card (MMC), an embedded MMC (eMMC), a peripheral component interconnection (PCI), PCI-express (PCI-e or PCIe), Advanced Technology Attachment (ATA), Serial-ATA (SATA), Parallel-ATA (PATA), a small computer system interface (SCSI), an enhanced small disk interface (ESDI), Integrated Drive Electronics (IDE), Firewire, Universal Flash Storage (UFS), WiFi, Bluetooth, and/or nonvolatile memory express (NVMe). For example, the connector 2300 may be defined by at least one of the above-described various communication protocols.

For example, the memory device 2200 may be implemented as any of various nonvolatile memory devices, such as Electrically Erasable and Programmable ROM (EE-PROM), NAND flash memory, NOR flash memory, Phase-change RAM (PRAM), Resistive RAM (ReRAM), Ferroelectric RAM (FRAM), and/or Spin-Transfer Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and form a memory card, such as a personal computer memory card international association (PCMCIA), a compact flash card (CF), a smart media card (e.g., SM or SMC), a memory stick, a multimedia card (e.g., MMC, RS-MMC, MMCmicro, or eMMC), a secure digital (SD) card (e.g., SD, miniSD, microSD, or SDHC), and universal flash storage (UFS).

Figure 8:
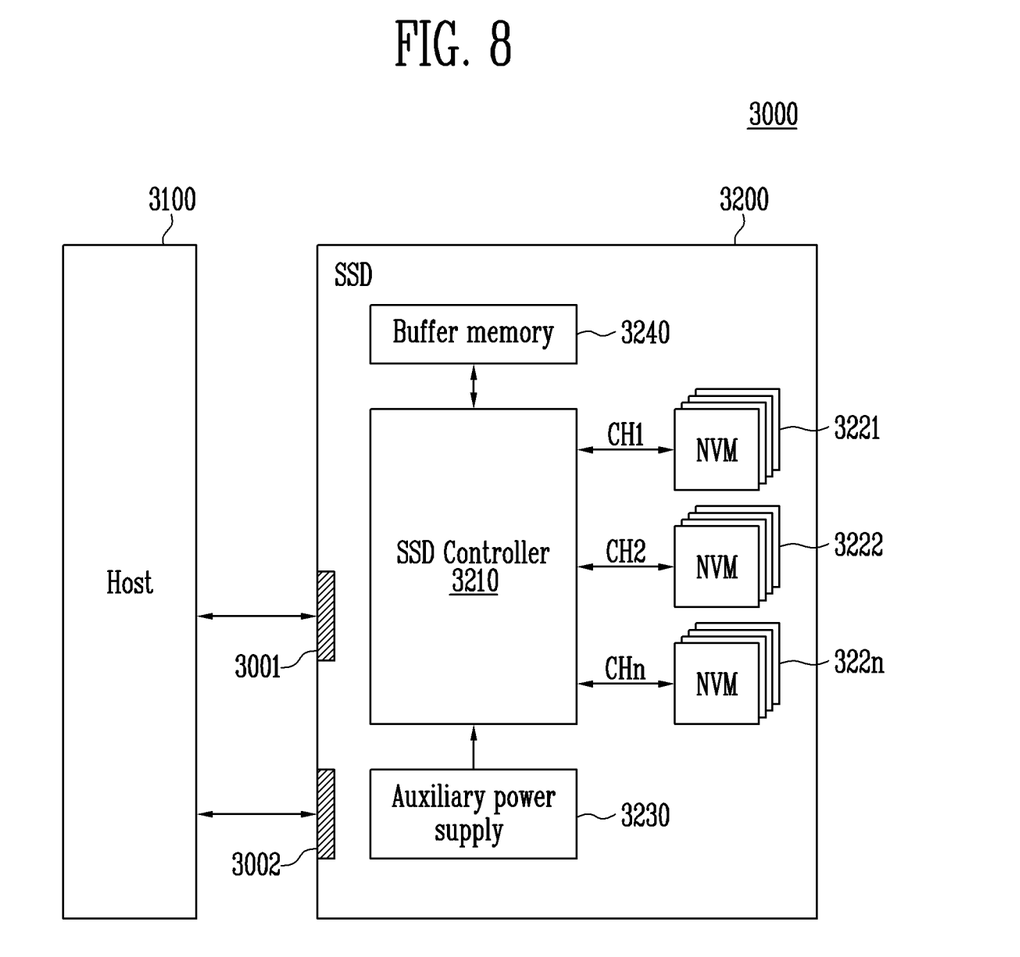
FIG. 8 is a block diagram illustrating a solid state drive (SSD) system to which a storage device is applied according to an embodiment of the present disclosure.

FIG. 8 is a block diagram illustrating a solid state drive (SSD) system 3000 to which a storage device is applied according to an embodiment of the present disclosure.

Referring to FIG. 8, the SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memory 3221 to 322$n$, an auxiliary power supply 3230, and a buffer memory 3240.

According to an embodiment, the SSD controller 3210 may perform the function of the memory controller 200 described above with reference to FIG. 1.

The SSD controller 3210 may control the plurality of flash memory 3221 to 322n in response to the signals received from the host 3100. For example, the signals may be based on the interfaces of the host 3100 and the SSD 3200. For example, the signals may be defined by at least one of various interfaces such as a Universal Serial Bus (USB), a multimedia card (MMC), an embedded MMC (eMMC), a peripheral component interconnection (PCI), PCI-express (PCI-e or PCIe), Advanced Technology Attachment (ATA), Serial-ATA (SATA), Parallel-ATA (PATA), a small computer system interface (SCSI), an enhanced small disk interface (ESDI), Integrated Drive Electronics (IDE), Firewire, Universal Flash Storage (UFS), WiFi, Bluetooth, and/or nonvolatile memory express (NVMe).

The auxiliary power supply 3230 may be coupled to the host 3100 through the power connector 3002. The auxiliary power supply 3230 may be charged with power supplied from the host 3100. The auxiliary power supply 3230 may supply power of the SSD 3200 when power is not smoothly supplied from the host 3100. For example, the auxiliary power supply 3230 may be disposed within or external to the SSD 3200. For example, the auxiliary power supply 3230 may be disposed on a main board and may supply auxiliary power to the SSD 3200.

The buffer memory 3240 may function as buffer memory of the SSD 3200. For example, the buffer memory 3240 may temporarily store data received from the host 3100 or data received from the plurality of flash memory 3221 to 322n, or may temporarily store metadata (for example, mapping tables) of the flash memory 3221 to 322n. The buffer memory 3240 may include volatile memory such as DRAM, SDRAM, DDR SDRAM, LPDDR SDRAM, or GRAM or nonvolatile memory such as FRAM, ReRAM, STT-MRAM, or PRAM.

According to an embodiment, the host 3100 may operate in the same manner as the host 300 described with reference to FIG. 4.

Figure 9:
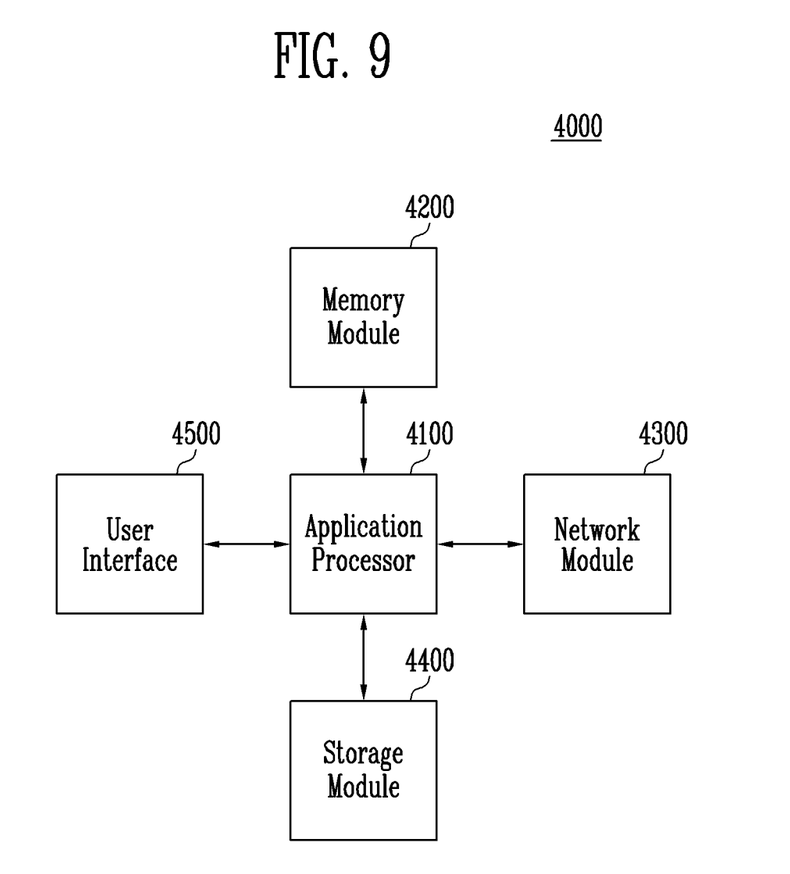
FIG. 9 is a block diagram illustrating a user system to which a storage device is applied according to an embodiment of the present disclosure.

FIG. 9 is a block diagram illustrating a user system 4000 to which a storage device is applied according to an embodiment of the present disclosure.

Referring to FIG. 9, the user system 4000 may include an application processor 4100, a memory module 4200, a network module 4300, a storage module 4400, and a user interface 4500.

The application processor 4100 may operate components included in the user system 4000, an Operating System (OS), or a user program. For example, the application processor 4100 may include controllers, interfaces, graphic engines, and the like, for controlling the components included in the user system 4000. The application processor 4100 may be provided as a System-on-Chip (SoC).

The memory module 4200 may function as main memory, operational memory, buffer memory, or cache memory of the user system 4000. The memory module 4200 may include volatile random access memory such as DRAM, SDRAM, DDR SDRAM, DDR2 SDRAM, DDR3 SDRAM, LPDDR SDRAM, LPDDR2 SDRAM, and LPDDR3 SDRAM or nonvolatile random access memory such as PRAM, ReRAM, MRAM, and FRAM. For example, the application processor 4100 and the memory module 4200 may be packaged based on Package-on-Package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or Wi-Fi. For example, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. According to an embodiment, the storage module 4400 may be implemented as a nonvolatile semiconductor memory device, such as Phase-change RAM (PRAM), Magnetic RAM (MRAM), Resistive RAM (RRAM), NAND flash memory, NOR flash memory, or NAND flash memory having a three-dimensional (3D) structure. For example, the storage module 4400 may be provided as a removable storage medium (i.e., removable drive), such as a memory card or an external drive of the user system 4000.

According to an embodiment, the storage module 4400 may include a plurality of nonvolatile memory devices, and the plurality of nonvolatile memory devices may operate in the same manner as the memory device as described above with reference to FIG. 1. The storage module 4400 may operate in the same manner as the storage device 50 described above with reference to FIG. 1.

The user interface 4500 may include interfaces which input data or commands to the application processor 4100 or output data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, or a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, or a monitor.

According to embodiments of the present disclosure, a computing system having improved write performance and an operating method of the computing system are provided.

While the present invention has been illustrated and described in connection with various embodiments, those skilled in the art will understand in light of this disclosure that various changes in form and operation may be made without departing from the spirit and scope of the present invention. The present invention encompasses all such changes that fall within the scope of the claims.

What is claimed is:

1. A computing system; comprising: a host configured to generate a host authentication code; and a storage device configured to receive a first request among a series of requests regarding security write and write data from the host, generate a device authentication code using the write data in response to the first request while the host authentication code is generated, receive a second request among the series of requests and the host authentication code from the host, and perform a program operation on the write data based on a result of comparing the host authentication code with the device authentication code in response to the second request, wherein the generation of the host authentication code is in parallel with receiving the write data, and wherein the host authentication code is sent to the storage device in a status request message when the generation of the host authentication code is complete.

2. The computing system of claim 1, wherein the host generates the host authentication code while providing the write data to the storage device.

3. The computing system of claim 1, wherein the host authentication code is generated in parallel with generation of the device authentication code by the storage device.

4. The computing system of claim 1, wherein the storage device comprises:
   a memory device including a write protection area; and
   a memory controller configured to control the security write.

5. The computing system of claim 4, wherein the memory controller comprises:
   a data verification component configured to generate authentication information which indicates integrity of the write data based on the result of comparing the host authentication code and the device authentication code; and
   an authenticated write controller configured to control the program operation based on the authentication information in response to the second request.

6. The computing system of claim 5, wherein the authenticated write controller provides a first response, which indicates whether the first request has been received, to the host in response to the first request, and provides a second response, which indicates whether the second request has been received, to the host in response to the second request.

7. The computing system of claim 5, wherein the authenticated write controller provides a third response, which includes a result of the program operation, to the host in response to a third request among the series of requests received from the host.

8. The computing system of claim 7, wherein the result of the program operation includes information indicating whether the write data has integrity and information indicating whether the program operation has passed or failed.

9. The computing system of claim 5, wherein the authenticated write controller controls the memory device to store the write data in the write protection area during the program operation.

10. The computing system of claim 5, wherein the data verification component comprises:
    an authentication code generator configured to generate the device authentication code based on a key shared between the host and the storage device and the received write data; and
    an authentication code comparator configured to generate the authentication information based on whether the host authentication code is the same as the device authentication code.

11. The computing system of claim 1, wherein the device authentication code and the host authentication code are generated based on a message authentication code (MAC) algorithm.

12. A host comprising:
    a host memory configured to store write data; and
    a host processor configured to provide a first request among a series of requests regarding security write and the write data to a storage device, generate a host authentication code using the write data, and provide a second request among the series of requests and the host authentication code to the storage device,
    wherein the generation of the host authentication code is in parallel with providing the write data, and
    wherein the host authentication code is sent to the storage device in a status request message when the generation of the host authentication code is complete.

13. The host of claim 12, wherein the host processor provides a third request among the series of requests, and
    the third request requests a result of a program operation on the write data to the storage device.

14. The host of claim 13, wherein the result of the program operation includes information indicating whether the program operation has passed or failed and authentication information indicating integrity of the write data, and
    wherein the authentication information is generated based on a result of comparing a device authentication code, which is generated by the storage device based on the write data, with the host authentication code.

15. The host of claim 12, wherein the host processor generates the host authentication code based on a key shared between the storage device and the host and the write data.

16. The host of claim 12, wherein the host processor receives a first response indicating whether the first request has been received from the storage device, provides the second request to the storage device in response to the first response, receives a second response indicating whether the second request has been received from the storage device, and provides a third request among the series of requests to the storage device in response to the second response.

17. The host of claim 12, wherein the host processor generates the host authentication code while providing the write data to the storage device.

18. The host of claim 12, wherein the host authentication code is generated in parallel with generation of a device authentication code by the storage device.

19. The host of claim 12, wherein the write data is stored in a write protection area included in the storage device during a program operation.

20. The host of claim 12, wherein the host authentication code is generated based on a message authentication code (MAC) algorithm.

* * * * *